(12) United States Patent
AlSinan et al.

(10) Patent No.: US 12,474,498 B2
(45) Date of Patent: Nov. 18, 2025

(54) METHOD TO CALCULATE THE EFFECTIVE HYDRAULIC APERTURE AND PERMEABILITY OF ROCK FRACTURES

(71) Applicants: SAUDI ARABIAN OIL COMPANY, Dhahran (SA); King Abdullah University of Science and Technology, Thuwal-Jeddah (SA)

(72) Inventors: Marwah Mufid AlSinan, Al Qatif (SA); Hyung Tae Kwak, Dhahran (SA); Xupeng He, Thuwal (SA); Hussein Hoteit, Thuwal (SA)

(73) Assignees: SAUDI ARABIAN OIL COMPANY, Dhahran (SA); King Abdullah University of Science and Technology, Thuwal-Jeddah (SA)

( * ) Notice: Subject to any disclaimer, the term of this patent is extended or adjusted under 35 U.S.C. 154(b) by 1022 days.

(21) Appl. No.: 17/489,445

(22) Filed: Sep. 29, 2021

(65) Prior Publication Data

US 2022/0187491 A1    Jun. 16, 2022

Related U.S. Application Data

(60) Provisional application No. 63/125,078, filed on Dec. 14, 2020.

(51) Int. Cl.
*G01V 5/04* (2006.01)
*E21B 43/26* (2006.01)
(Continued)

(52) U.S. Cl.
CPC .............. *G01V 5/045* (2013.01); *E21B 43/26* (2013.01); *E21B 49/00* (2013.01); *G01V 1/345* (2013.01); *G01V 5/12* (2013.01)

(58) Field of Classification Search
CPC .......... G01V 5/045; G01V 1/345; G01V 5/12; E21B 43/26; E21B 49/00
See application file for complete search history.

(56) References Cited

U.S. PATENT DOCUMENTS 4,884,438 A    12/1989  Jones et al.
8,140,310 B2    3/2012  Fitzpatrick et al.
(Continued)

FOREIGN PATENT DOCUMENTS

CN    108518212 A    9/2018

OTHER PUBLICATIONS

A. P. Oron, B. Berkowitz, "Flow in rock fractures: The local cubic law assumption reexamined", pp. 2811-2825, (Year: 1998).*
(Continued)

*Primary Examiner* — Kibrom K Gebresilassie
(74) *Attorney, Agent, or Firm* — Osha Bergman Watanabe & Burton LLP

(57) ABSTRACT

Systems and methods for determining a 3D hydraulic aperture of a 3D fracture are disclosed. The method includes, obtaining a geometry of the 3D fracture, determining a fluid flow direction through the 3D fracture, and dividing the 3D fracture into a plurality of 2D cross-sections oriented substantially parallel to the fluid flow direction. The method further includes dividing each 2D cross-section into a plurality of Type I and Type II fracture segments based on a segment aspect ratio and a segment roughness ratio, determining a 2D segment hydraulic aperture for each of the plurality of Type I and Type II fracture segments, and determining the 3D hydraulic aperture of the 3D fracture based, at least in part, on the 2D segment hydraulic apertures of the plurality of Type I and Type II fracture segments.

17 Claims, 9 Drawing Sheets

(51) Int. Cl.
*E21B 49/00* (2006.01)
*G01V 1/34* (2006.01)
*G01V 5/12* (2006.01)

(56) References Cited

U.S. PATENT DOCUMENTS

| | | |
|---|---|---|
| 8,898,046 B2 | 11/2014 | Moos et al. |
| 10,571,605 B2 | 2/2020 | Crawford et al. |
| 2017/0038489 A1 | 2/2017 | Pandey et al. |
| 2017/0275970 A1 | 9/2017 | Crawford et al. |
| 2017/0321543 A1* | 11/2017 | Plateaux ................. E21B 43/26 |
| 2018/0016895 A1 | 1/2018 | Weng et al. |

OTHER PUBLICATIONS

G. He, E. Wang, X. Liu, "Modified governing equation and numerical simulation of seepage flow in a single fracture with three-dimensional roughness" pp. 1-20, (Year: 2016).*

Xupeng He, Marwa Sinan, Hyung Kwak, Hussein Hoteit, "A Corrected Cubic Law for Single-Phase Laminar Flow Through Rough-Walled Fractures", Advances in Water Resources, vol. 154, 2021 (38 pages).

International Search Report and Written Opinion issued in Application No. PCT/US2021/063253, mailed on Mar. 3, 2022 (14 pages).

* cited by examiner

METHOD TO CALCULATE THE EFFECTIVE HYDRAULIC APERTURE AND PERMEABILITY OF ROCK FRACTURES

BACKGROUND

Hydraulic properties of rock fractures are essential parameters for the modeling of fluid flow and transport in subsurface fractured porous media. Fluid-flow through rock factures within a subsurface formation may often be the mechanism that dominates the flow of hydrocarbon fluids through a hydrocarbon reservoir. All Darcy-based modeling approaches, including discrete and homogenization models, require evaluation of the effective permeability of rock fractures. Estimating fracture permeability is challenging because of the heterogeneous nature of rock fractures that include variable aperture, roughness, and tortuosity. The cubic law, based on the parallel-plate concept, has been traditionally used to estimate the hydraulic properties of individual fractures. This upscaling approach, however, is known to overestimate the fracture hydraulic properties, resulting in misleading predictions. Many other methods known to one of ordinary skill in the art, have been proposed in the literature to improve the accuracy of the cubic law. All these methods, however, exhibit limitations related to inaccuracy and inefficiency, and therefore they are not optimum to be used in modeling fractured reservoirs.

Engineers and geo scientists working in the oil and gas industry frequently require knowledge of fluid-flow characteristics of fractures within subsurface formations to inform decisions relating to designing reservoir stimulation techniques, such as hydraulic fracturing, and acidizing. In addition, the fluid-flow characteristics of fractures may be important for designing the type and size of surface hydrocarbon production facilities, and for predicting the future economic value of a hydrocarbon reservoir. The fluid-flow characteristics of natural fractures, natural fracture networks, and hydraulic fractures may each be important in making decisions on reservoir stimulation, production facility design, and economic value.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a method for determining a 3D hydraulic aperture of a 3D fracture. The method includes, obtaining a geometry of the 3D fracture, determining a fluid flow direction through the 3D fracture, and dividing the 3D fracture into a plurality of 2D cross-sections oriented substantially parallel to the fluid flow direction. The method further includes dividing each 2D cross-section into a plurality of Type I and Type II fracture segments based on a segment aspect ratio and a segment roughness ratio, determining a 2D segment hydraulic aperture for each of the plurality of Type I and Type II fracture segments, and determining the 3D hydraulic aperture of the 3D fracture based, at least in part, on the 2D segment hydraulic apertures of the plurality of Type I and Type II fracture segments In general, in one aspect, embodiments disclosed herein relate to non-transitory computer readable medium storing instructions executable by a computer processor, the instructions comprising functionality for receiving a geometry of the 3D fracture, determining a fluid flow direction through the 3D fracture, and dividing the 3D fracture into a plurality of 2D cross-sections oriented substantially parallel to the fluid flow direction. The instructions further including functionality for dividing each 2D cross-section into a plurality of Type I and Type II fracture segments based on a segment aspect ratio and a segment roughness ratio, determining a 2D segment hydraulic aperture for each of the plurality of Type I and Type II fracture segments, and determining the 3D hydraulic aperture of the 3D fracture based, at least in part, on the 2D segment hydraulic apertures of the plurality of Type I and Type II fracture segments.

In general, in one aspect, embodiments disclosed herein relate to a system including an X-ray tomography machine for determining a geometry of a 3D fracture and a computer processor. The computer processor is configured to receive the geometry of the 3D fracture, determine a fluid flow direction through the 3D fracture, and divide the 3D fracture into a plurality of 2D cross-sections oriented substantially parallel to the fluid flow direction. The computer processor is further configured to divide each 2D cross-section into a plurality of Type I and Type II fracture segments based, at least in part, on a segment aspect ratio and a segment roughness ratio, determine a 2D segment hydraulic aperture for each of the plurality of Type I and Type II fracture segments, and determine the 3D hydraulic aperture of the 3D fracture based, at least in part, on the 2D segment hydraulic apertures of the plurality of Type I and Type II fracture segments.

Other aspects and advantages of the claimed subject matter will be apparent from the following description and the appended claims.

BRIEF DESCRIPTION OF DRAWINGS

Specific embodiment of the disclosed technology will now be described in detail with reference to the accompanying figures. Like elements in the various figures are denoted by like reference numerals for consistency.

DETAILED DESCRIPTION

In the following detailed description of embodiment of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
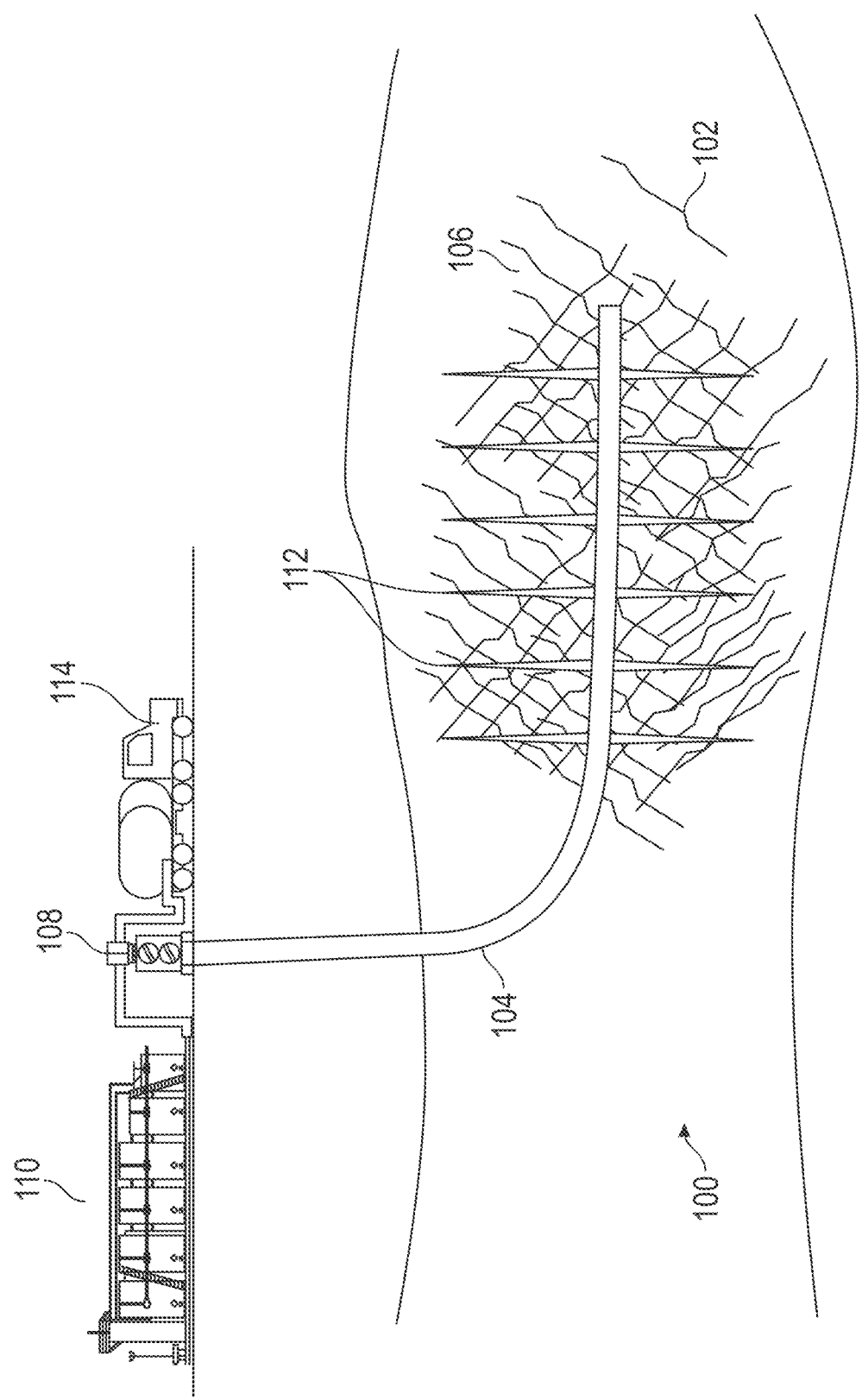
FIG. 1 shows a system, in accordance with one or more embodiments.

Embodiments disclosed herein relate to a novel method and system for calculating the fluid-flow characteristics of a fracture, and a network of fractures, which may be present within a hydrocarbon reservoir (100) as shown in FIG. 1. The fractures, may be natural fractures (102) that preexist the drilling of a wellbore (104) into the hydrocarbon reservoir (100), and may be the result of current, or ancient, geological stresses generated by tectonic stresses, and the result of the motion of geological formations due to earthquakes on neighboring faults. A plurality of natural fractures (102) may intersect with one another to produce an intersecting natural fracture network (106). A natural fracture network (106) may be intersected by the wellbore (104) and provide a preferential flow-path that facilitates the flow of fluids, including both hydrocarbons and water, from the hydrocarbon reservoir into the wellbore, and thereafter to the well head (108) and to surface production facilities (110).

Irrespective of the presence or absence of a natural fracture (102) or a natural fracture network (106), hydraulic fractures (112) may be generated in the hydrocarbon reservoir by pumping a fluid, often primarily water, from a hydraulic fracturing unit (114) on the surface through the well head (108) and the wellbore (104). When the pressure in the wellbore (104) is sufficiently increased by the pumping of the hydraulic fracturing unit (114) on the surface, hydraulic fractures (112) may be created within the hydrocarbon reservoir (100).

Figure 2B:
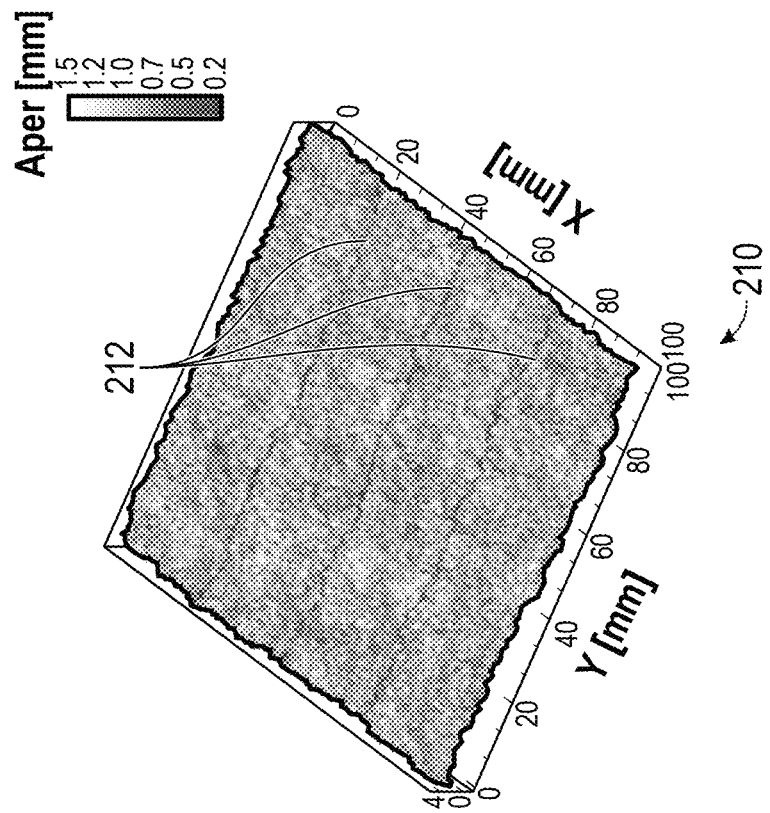
FIGS. 2A, 2B, and 2C show fracture parameters in accordance with one or more embodiments.
Figure 2A:
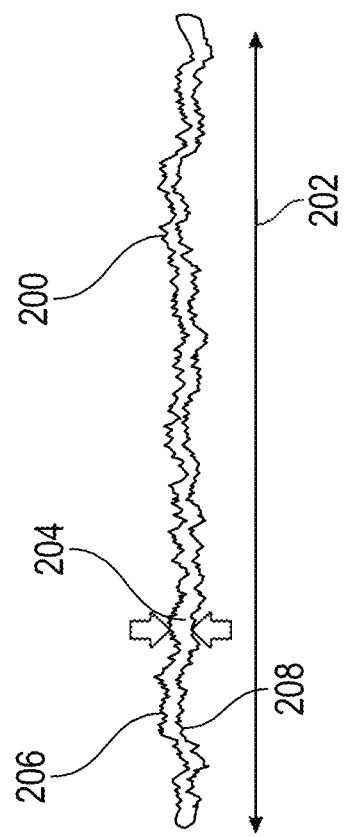

FIG. 2A shows a cross-section of a fracture (200). The fracture (200) may be a natural fracture (102) which may preexist the drilling of the wellbore (104), or it may be a hydraulic fracture (112). Fractures (200) are approximately two-dimensional (2D) having two directions which are much greater than a third dimension. For example, the fracture length (202) may be tens, or hundreds of feet long and the fracture width may be of a similar size. However, the gap between the fracture upper surface (206) and the fracture lower surface (208), is the fracture thickness and may be denoted the "mechanical aperture" (204) in FIG. 2A, may be less, often much less, than one inch thick at its thickest point. Although the terms "upper surface" and "lower surface" are precise only for a fracture lying substantially in a horizontal plane, the nomenclature "upper" and "lower" will be used herein to denote opposing surfaces of a fracture irrespective of the macroscale orientation of the fracture.

The mechanical aperture of a fracture may be measured in situ using borehole imaging tools and in laboratory samples and using methods such as optical microscopy, laser interferometry, and X-ray tomography, The mechanical aperture (204) may vary significantly along the fracture length (202). At each boundary of the fracture (200), the mechanical aperture (204) may be zero. Further, at some locations within the fracture (200) the mechanical aperture (204) may be zero. At these locations, the fracture upper surface (206) and the fracture lower surface (208) touch one another.

FIG. 2B shows a map of the mechanical aperture of a portion of a fracture (210) as a function of the orthogonal directions x and y. The mechanical aperture (210) is the gap between the fracture upper surface (206) and the fracture lower surface (208). The value of the mechanical aperture at each point (x, y) on the map of the portion of the fracture (210) is given by the grayscale. For this portion of the fracture, which has an extent of x=4 inches (100 millimeters) in length and y=4 inches (100 millimeters) in width, the mechanical aperture varies from 0.008 inches (0.2 mm) to 0.06 inches (1.5 mm) FIG. 2B also shows the location of a plurality of cross-sections (212) such as the one shown in FIG. 2A.

In accordance with one or more embodiments, a fracture lying primarily in the x-y plane, such as that represented by the map of the mechanical aperture (210) shown in FIG. 2B, may be sampled by a plurality of 2D cross-sections (212). The plurality of 2D cross-sections (212) may be chosen to adequately represent the statistical characteristics of the fracture for the purposes of fluid-flow modeling.

For the portion of the fracture (210) shown in FIG. 2B, the arithmetic mean, $a_m$, and the standard deviation, $\sigma_m$, of the mechanical aperture may be calculated directly from the map of the mechanical aperture. For example, the arithmetic mean may be calculated as:

$$a_m = \frac{1}{(m*n)} \sum_{i=1}^{n} \sum_{j=1}^{m} a(x_i, y_j) \qquad \text{Equation (1)}$$

where $a(x_i, y_j)$ denotes the mechanical aperture at discrete sample points on the map of the mechanical aperture of a portion of a fracture (210). m and n denote the number of sample points in the x- and y-directions, respectively. Similarly, the standard deviation may be calculated as:

$$\sigma_m = \sqrt{\frac{1}{(m*n-1)} \sum_{i=1}^{n} \sum_{j=1}^{m} (a(x_i, y_j) - a_m)^2}. \qquad \text{Equation (2)}$$

Those skilled in the art will readily appreciate how the mean and standard deviation of the mechanical aperture may be calculated using the equation (1) and equation (2).

Figure 2C:
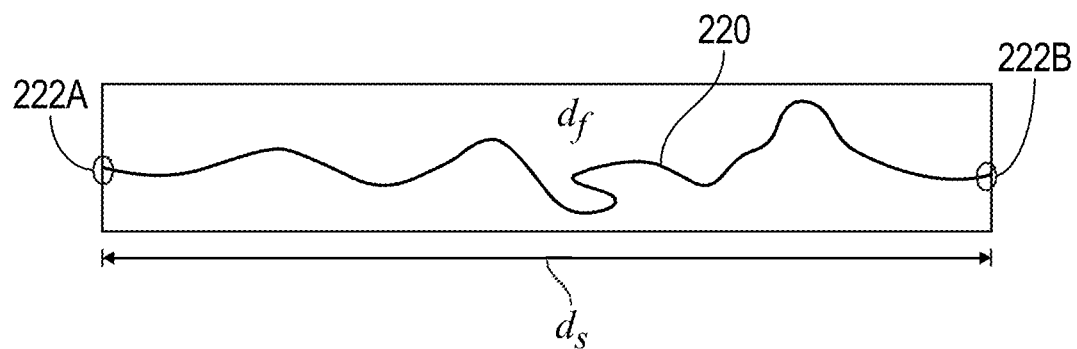

FIG. 2C depicts another important parameter characterizing a fracture (220). The tortuosity, $\tau$, may be defined as ratio of the fracture length measured along the center of its trajectory, $d_f$, between a first point (222A) on a fracture and a second point (222B) on the fracture, and the linear or straight-line distance, $d_s$, between the first point (222A) on the fracture (220) and the second point (222B) on the fracture (220). Thus:

$$\tau = \frac{d_f}{d_s}. \qquad \text{Equation (3)}$$

Note, $d_f$ is the distance traveled by non-turbulent, or laminaflow, fluid traveling through the fracture (220) between a first point (222A) in the fracture and a second point (222B) in the fracture if the two points are on the same streamline. The tortuosity, $\tau$, is a measure of how much further such a fluid flows in traveling between the first point (222A) and the second point (222B), compared to the straight-line distance.

Figure 3:
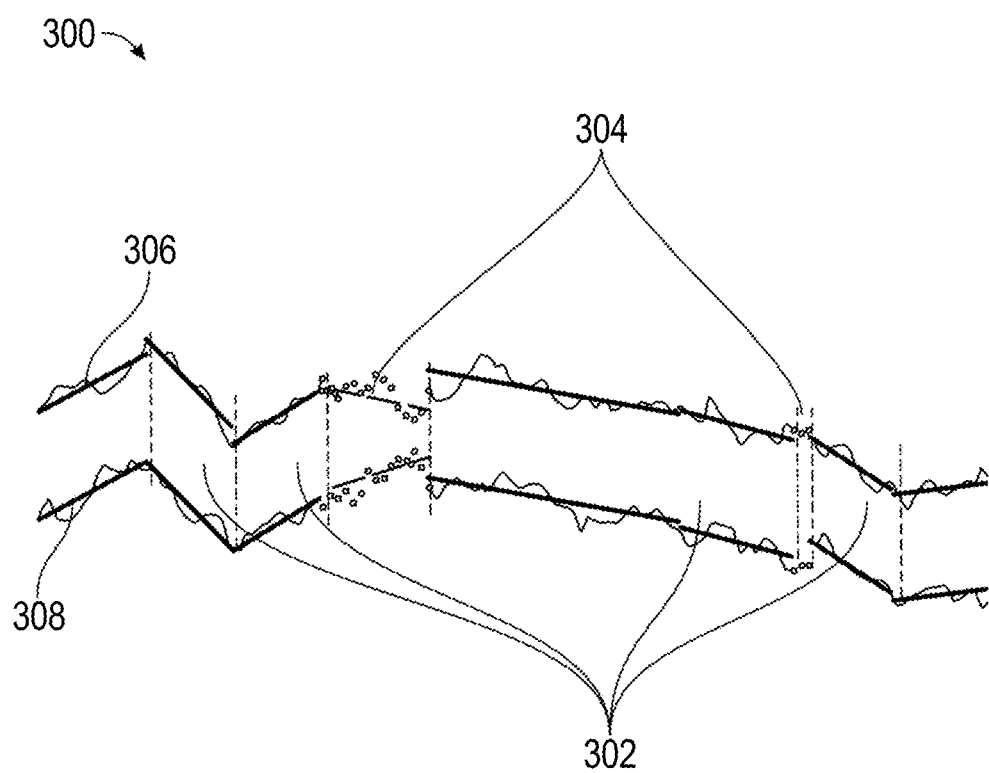
FIG. 3 depicts Type I and Type II fractures in accordance with one or more embodiments.

FIG. 3 shows a classification of fracture segments, in accordance with one or more embodiments. A fracture segment may be classified as a Type I (302) fracture segment, or a Type II (304) fracture segment based, at least in part, upon the averaged behavior of the mechanical aperture over the length of the segment. In a Type I fracture segment (302), the fracture upper surface (306) is approximately parallel to the fracture lower surface (308). In a Type II fracture segment (304), the fracture upper surface (306) is not approximately parallel to the fracture lower surface (308). In accordance with one or more embodiments, Type I and Type II fracture segments have different contributions to the hydraulic aperture of a fracture.

In accordance with one or more embodiments, the distinction between Type I and Type II may be stated quantitatively by defining two further parameters, a "segment aspect ratio" and a "segment roughness ratio". The segment aspect ratio for the i-th segment, $\delta_i$, may be defined as:

$$\delta_i = \frac{a_m(i)}{2d_s(i)} \qquad \text{Equation (4)}$$

where $a_m(i)$ and $d_s(i)$ denotes the mean mechanical aperture and straight-line distance between the end of the segment for the i-th segment, respectively.

The segment roughness ratio for the i-th segment, $\varepsilon_i$, may be defined as:

$$\varepsilon_i = \frac{2\max\{\sigma_u(i), \sigma_l(i)\}}{d_s(i)} \qquad \text{Equation (5)}$$

where $\sigma_u(i)$ and $\sigma_l(i)$ denotes the standard deviation of the fracture upper surface (306), and the fracture lower surface (308), respectively. In accordance with one or more embodiments, a fracture segment which satisfies both:

$$\delta_i < \delta_0 \qquad \text{Equation (6)}$$

and $$\varepsilon_i < \varepsilon_0, \qquad \text{Equation (7)}$$

where $\delta_0$ and $\varepsilon_0$ are constant parameters, may be classified as a Type I fracture segment. A fracture segment that does not satisfy both inequalities may be classified as a Type II fracture segment. Optimum and adequate choices for $\delta_0$ and $\varepsilon_0$ may be calculated by computing the prediction error in the hydraulic aperture for many fracture geometries, and for different values of $\delta_0$ and $\varepsilon_0$. The prediction error in the hydraulic aperture may be determined by comparing the predicted value of the hydraulic aperture with the result obtained by solving the full-physics Navier-Stokes equation for single-phase fluid flow in a rough fracture using the mixed finite element (MFE) method in FEniCS, a public domain platform described by Logg, A., Mardal, K-A., Wells, G. 2012. *"Automated Solution of Differential Equations by the Finite Element Method"*, Springer, ISBN 978-3-642-23099-8. The applicability of the full Navier-Stokes equation and the accuracy of numerical solutions of the Navier-Stokes equation for estimating the hydraulic properties of rough-walled fractures are well known to those of ordinary skill in the art. However, numerical solutions to the Navier-Stokes equations are typically prohibitively expensive and impractical for routine field applications. Never the less, they provide useful reference solutions to quantify the accurate of approximate methods. Those skilled in the art will appreciate that the computations of prediction error by solving the equations above may be performed by a computer system having a processor, such as that shown in FIG. 9.

Figure 4:
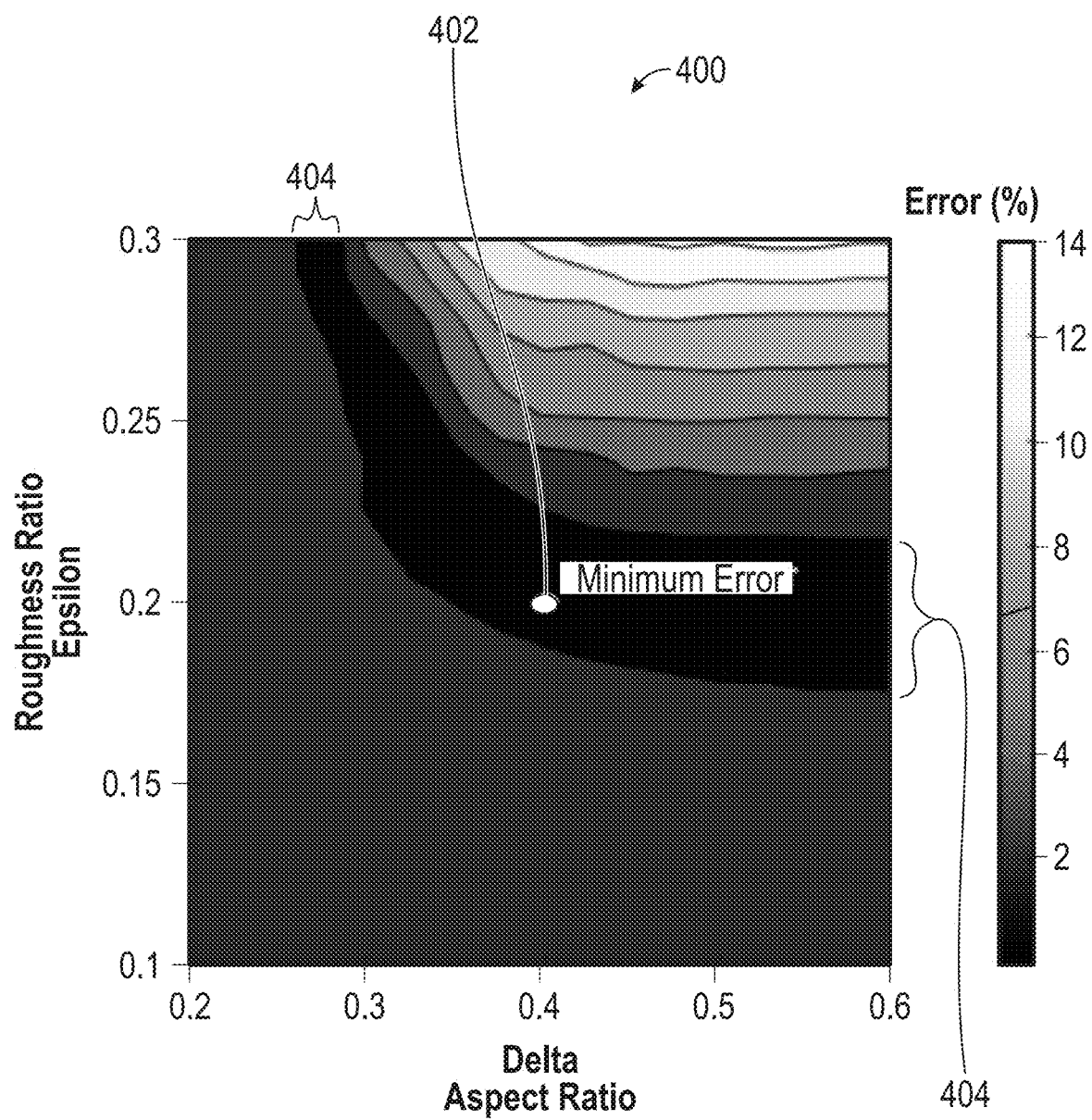
FIG. 4 shows predicted errors in accordance with one or more embodiments.

The hydraulic aperture error map (400) of a fracture for different values of $\delta_0$ and $\varepsilon_0$ is shown in FIG. 4, in accordance with one or more embodiments. The horizontal axis shows the fracture segment aspect ratio, $\delta_0$, as defined by equation (4). The vertical axis shows the fracture segment roughness ratio, $\varepsilon_0$, as defined by equation (5). An optimum choice of parameters (402), corresponding at a minimum value of the hydraulic aperture error lies at $\delta_0=0.4$ and $\varepsilon_0=0.2$, but other adequate values corresponding to small errors lie within the band indicated by the darkest shades (404).

In accordance with one or more embodiments, each 2D fracture cross-section may be divided into a plurality of segments of Types I and II by evaluating equations (4)-(7) for a plurality of candidate segments and determining the longest continuous segments that honor these constraints in equation (4)-(7). In accordance with one or more embodiments, the determination of the longest continuous segments satisfying the inequalities in equations (6)-(7) may be carried out using a multi-linear regression (MLR) algorithm.

Figure 5:
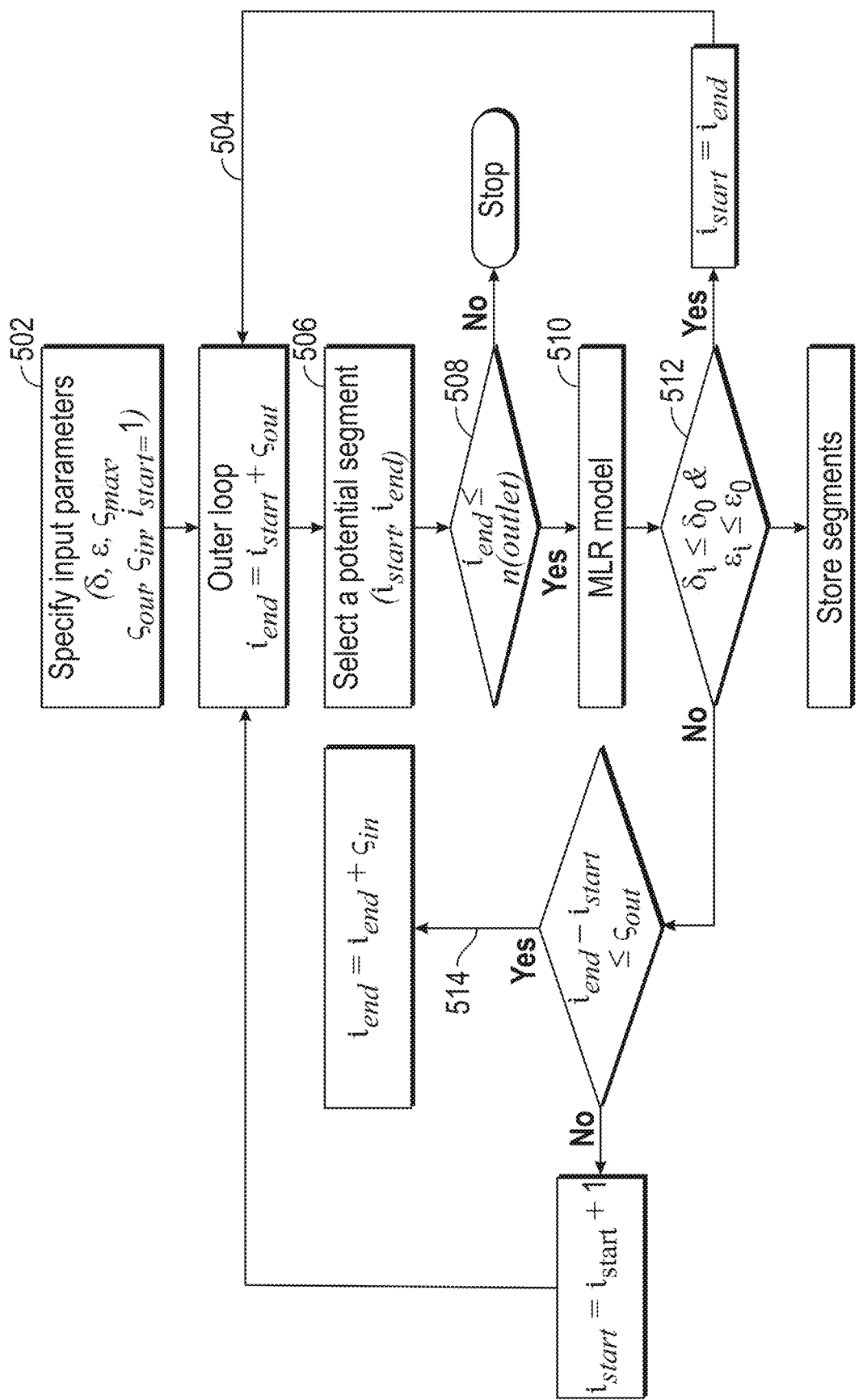
FIG. 5 shows a flowchart in accordance with one or more embodiments.

FIG. 5 shows a flowchart for determining Type I and Type II fracture segments in accordance with one or more embodiments. In Block 502, the input parameters are selected by the user, including without limitation, $\delta_0$, $\varepsilon_0$, check steps for the outer loop, the inner loop, and maximum steps for each segment (denoted a$\varsigma_{out}$,$\varsigma_{in}$, and $\varsigma_{max}$ respectively). The initial starting segment $i_{start}$ is also selected in Block 502.

In accordance with one or more embodiments, an outer loop (504) checks the availability of possible segments (506) based, at least in part, on the fracture topological data. After checking the last segment has not been selected (508) the MLR algorithm (510) is applied to the potential segment to calculate the values of $\delta_i$ and $\varepsilon_i$. The segment is formed if both constraints, equations (6) and (7) are honored (512). The algorithm next updates the $i_{start}$ with $i_{end}$ and resume the checking process for a new potential segment. If both inequalities, equations (6) and (7) are not satisfied, the process proceeds to the inner loop (514).

The inner loop extends the range of possible fracture segments by adding an inner point to the outer loop points. This forms a potential segment that is introduced into the outer loop. If the number of iterations required to find a potential segment exceeds $\varsigma_{max}$, the start point $i_{start}$ is replaced with $i_{start}+1$ and the outer loop re-initiated.

In accordance with other embodiments, the determination of the longest continuous segments satisfying the inequalities in equations (4)-(7) may be carried out using multiple regression, discriminant analysis, logistic regression, analysis of variance, logit analysis, factor analysis, and multidimensional scaling. One of ordinary skill in the art will readily appreciate that the determination of the longest continuous segments satisfying the inequalities in equations (4)-(7) may also be carried using a variety of other algorithms, such as Monte Carlo inversion, and simulated annealing.

Figure 6:
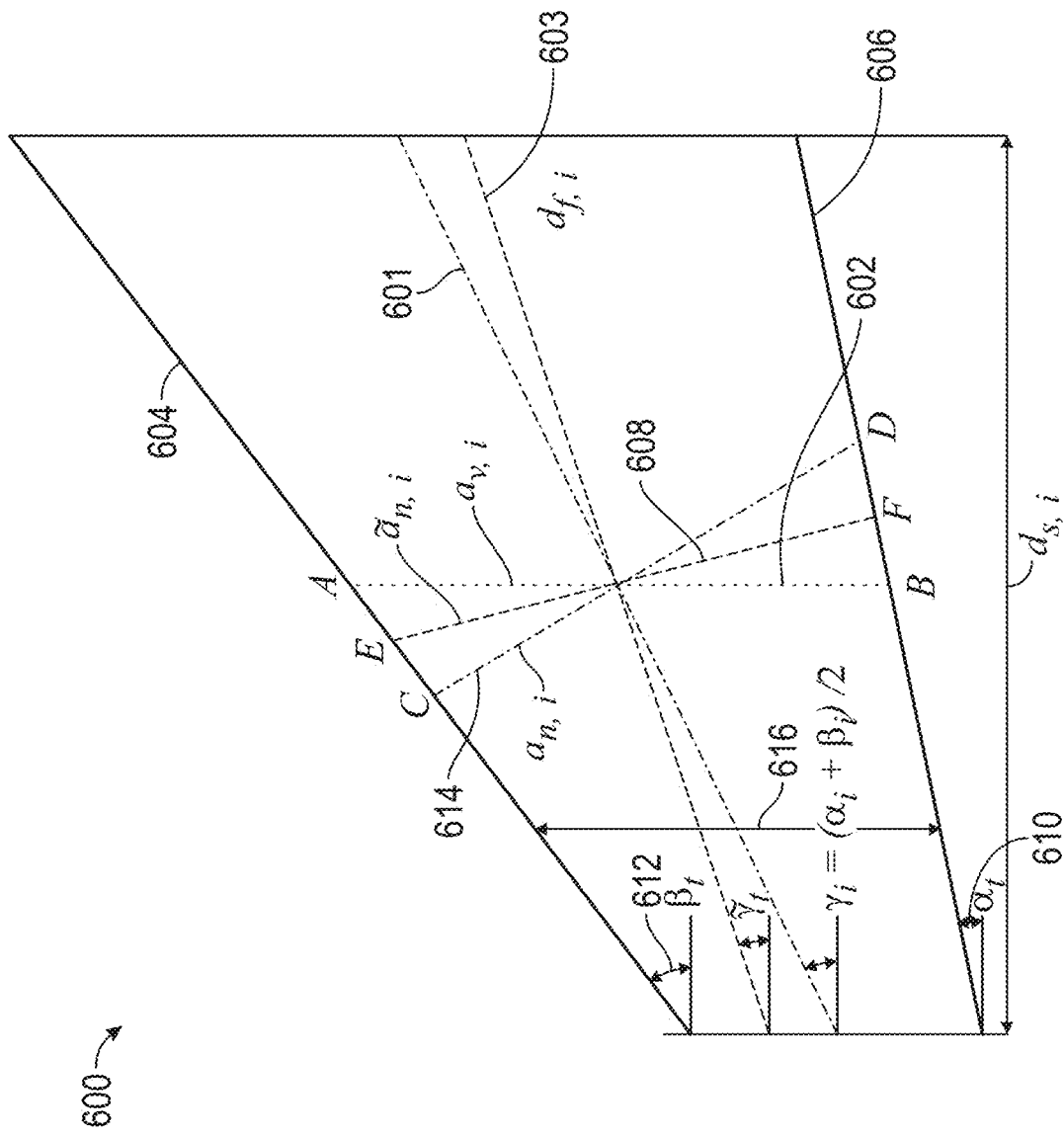
FIG. 6 show parameters of a Type II fracture in accordance with one or more embodiments.

FIG. 6 depicts a Type II fracture segment, in accordance with one or more embodiment. In accordance with one or more embodiment, a corrected flow direction, $\tilde{\gamma}_i$, within the $i^{th}$ fracture segment, may be determined based upon the relative configuration of a segment in relation to its neighboring segments, the $(i-1)^{th}$ and $(i+1)^{th}$, respectively.

In accordance with one or more embodiment, FIG. 4 shows a Type II fracture segment (600), that has a fracture segment center line (601) lying at the center of the Type II fracture segment (600) at each point along its length. The fracture segment center line (601) has an angle of inclination, $\gamma_i$, measured with respect to a reference direction. In a Type I fracture segment the fracture center line is also the flow direction but for a Type II fracture segment the fracture center line (601) may not be the flow direction. According to one or more embodiments a corrected flow direction (603) may be calculated. The corrected flow direction (603) may have an angle of inclination, $\tilde{\gamma}_i$, measured with respect to the reference direction, given by:

$$\tilde{\gamma}_i = \begin{cases} \gamma_i, & \delta_i \leq 1/2 \\ \overline{\left(\frac{\gamma_{i-1}d_{s,i-1} + \gamma_i d_{s,i}}{d_{s,i-1} + d_{s,i}}, \frac{\gamma_{i+1}d_{s,i+1} + \gamma_i d_{s,i}}{d_{s,i+1} + d_{s,i}}\right)}, & \delta_i > 1/2 \end{cases} \quad \text{Equation (8)}$$

where $\overline{()}$ denotes the harmonic mean of the quantity within parentheses.

FIG. 6 shows the vertical mechanical aperture, $a_{v,i}$, of the $i^{th}$ fracture segment (602) measured at the mid-point of the fracture segment. $a_{v,i}$ is the distance between the fracture segment upper surface (604) and the fracture surface lower surface (606).

The normal mechanical aperture (608), $a_{n,i}$, may be defined as:

$$a_{n,i} = \lambda_i a_{v,i} \quad \text{Equation (9)}$$

where $$\lambda_i = \begin{cases} \cos \alpha_i, & i \in \text{Type } I \\ \dfrac{1}{\left(\dfrac{1}{\cos \alpha_i} + \dfrac{1}{\cos \beta_i}\right)\left[\dfrac{1}{\cos(\tilde{\gamma}_i - \alpha_i)} + \dfrac{1}{\cos(\tilde{\gamma}_i - \beta_i)}\right]}, & i \in \text{Type } II \end{cases} \quad \text{Equation (10)}$$

and $\alpha_i$ (610) and $\beta_i$ (612) are the angle of inclination between the upper surface (606) and lower surface (604) of the fracture, respectively, measured from a common direction.

In accordance with one or more embodiment, a corrected vertical aperture (614) may be defined as:

$$\tilde{a}_{v,i} = \left(\frac{2a_{v,i-1/2}^2 a_{v,i+1/2}^2}{a_{v,i-1/2} + a_{v,i+1/2}}\right)^3 \quad \text{Equation (11)}$$

In accordance with one or more embodiment, when the geometric inequalities expressed in equations (6) and (7) are satisfied, a fracture segment may be designated a Type I rough-walled segment, that may be approximated by a segments with two parallel planar surfaces. An approximation is introduced in doing so due to the neglect of the roughness of the walls of the fracture segment. The error associated with this approximation increases with roughness. In accordance with one or more embodiment, a segment roughness correction factor, $\eta_i$, quantifying the effect of the roughness of the upper and lower surfaces of the fracture segment may be defined as:

$$a_{n,i} = \eta_i a_{n,i} \quad \text{Equation (12)}$$

where $a_{n,i}$ is the hydraulic aperture of the fracture segment, and $$\eta_i = \begin{cases} 1 - \dfrac{2s_i}{a_{ni}}, & i \in \text{Type } I \\ 1, & i \in \text{Type } II \end{cases} \quad \text{Equation (13)}$$

The standard deviation of the segment roughness, $s_i$, is given by:

$$s_i = \sqrt{\frac{1}{n_i - 3}\sum_{j=1}^{n_i}\left(h_j - \hat{h}_j\right)} \quad \text{Equation (14)}$$

where $n_i$ is the number of sample points used to digitize the $i^{th}$ fracture segment, $h_j$ is the mechanical aperture (616) at the $j^{th}$ point and $\hat{h}_j$ is the arithmetic mean of $h_j$ over all sample points.

In accordance with one or more embodiment, a flow-direction distance $d_f$ of a 2D cross-section of a fracture may be defined by the sum of local flow-direction distances of all segments of Type I and Type II, such that:

$$d_f \Sigma_{i=1}^{n_I+n_{II}} d_{f,i} = \Sigma_{i=1}^{n_I+n_{II}} \tau_i d_{s,i} \quad \text{Equation (15)}$$

where $\tau_i$ is given by equation (3). Similarly, the total fracture straight-line, linear distance, may be written as:

$$d = \Sigma_{i=1}^{n_I+n_{II}} d_i. \quad \text{Equation (16)}$$

The macroscopic fracture tortuosity, $\bar{\tau}$, may be defined in one or more embodiment as:

$$\bar{\tau} = \frac{d_f}{l}. \quad \text{Equation (17)}$$

In accordance with one or more embodiment, the effect of the roughness and the tortuously of each segment may be combined to determine a 2D hydraulic aperture, $a_{h,2D}$, for a 2D fracture cross-section, as:

$$a_{h,2D} = \left(\frac{d_f}{\sum_{i=1}^{n_I+n_{II}} \dfrac{d_{f,i}}{a_{h,i}^3}}\right)^{1/3} \quad \text{Equation (18)}$$

where $a_{h,i} = \eta_i a_{n,i} = \eta_i \lambda_i a_{h,i}$ is the hydraulic aperture of the $i^{th}$ fracture segment.

In accordance with one or more embodiments, the 3D hydraulic aperture of a 3D fracture, $a_{h,3D}$, may be determined from a plurality of 2D hydraulic apertures as:

$$a_{h,3D} = \frac{\langle a_{h,2D}^3 \rangle^{1/3}}{\langle \bar{\tau} \rangle^{1/3}} \quad \text{Equation (19)}$$

where $\langle \ \rangle$ denotes the arithmetic mean over all the 2D fractures comprising the 3D fracture. The average forming the numerator of equation (17) may be termed the "cube root mean cube average" by analogy to the (square) root mean square average well known to one of ordinary skill in the art.

Figure 7:
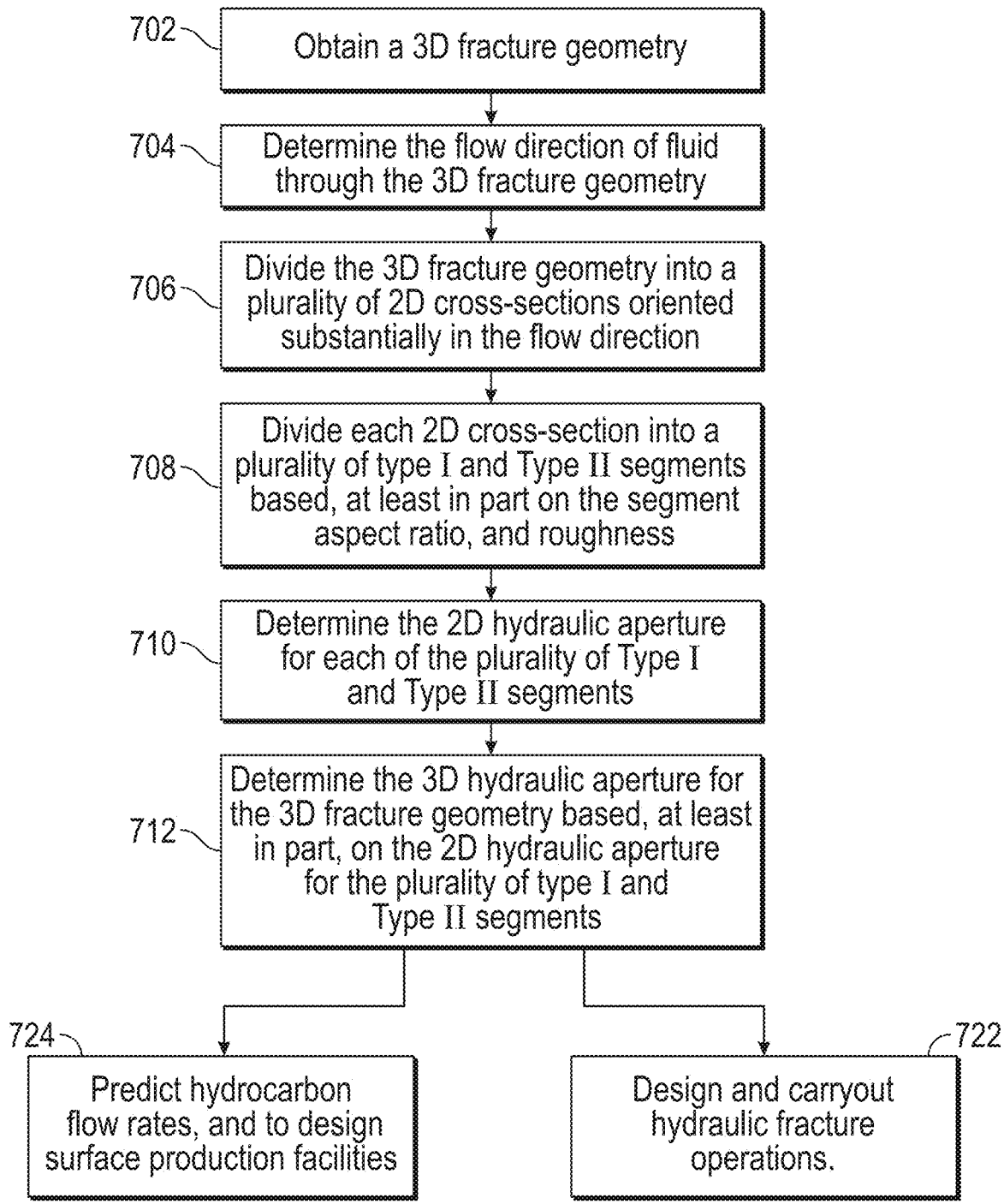
FIG. 7 shows a flowchart in accordance with one or more embodiments.

FIG. 7 shows a flowchart summarizing the workflow in accordance with one or more embodiments. In Block 702 a 3D geometrical description of a fracture may be obtained. The 3D description may include the spatial shape of the fracture including, without limitation, the spatial shape of the fracture's upper surface and the spatial shape of the fracture's lower surface and the mechanical aperture of the fracture as a function of position within the fracture.

In Block 704 the direction of fluid flow within the fracture may be determined, in accordance with one or more embodiments. The direction of fluid flow may be based, at least in part on the fluid pressure gradient experienced by the fracture, and upon the variation of fracture aperture, and the macroscopic fracture tortuosity.

In accordance with one or more embodiments, in Block 706 the 3D fracture geometry may be divided into a plurality of 2D cross-sections each oriented substantially in the flow direction determined in Block 704.

In accordance with one or more embodiments, in Block 708 each 2D cross-section may be divided into a plurality of Type I and Type II segments based, at least in part on the segment aspect ratio, and roughness. This division may be performed using the method depicted in FIG. 5 and may include the use of a multi-linear regression algorithm.

In Block 710 the 2D hydraulic aperture for each of the plurality of Type I and Type II segments may be determined based, at least in part on equations (12) and (13), in accordance with one or more embodiment.

In Block 712, in accordance with one or more embodiments, the 3D hydraulic aperture for the 3D fracture geometry may be determined based, at least in part, on the hydraulic aperture for each of the plurality of Type I and Type II segments. The hydraulic aperture for the 3D fracture geometry may be determined using equation (17).

In accordance with one or more embodiments, in Block 722 the 3D hydraulic aperture for the 3D fracture geometry may be used to design and carryout hydraulic fracturing operations. Designing a hydraulic fracturing operation may include, without limitation, inverting measurements from previous hydraulic fracturing operations to characterize hydraulic fractures and determine hydraulic fracture parameters, and using the determined characteristics and parameters to determine pump pressures and flow rates from the hydraulic fracturing unit (114) into the wellbore (104). Designing a hydraulic fracturing operation may include, without limitation, using one or more determined characteristics and parameters of the fracture to plan proppant load schedules. Carrying out a hydraulic operation may include, without limitation, inverting fluid pressure and flow rate data recorded in the wellbore (104), in real time, to modify pumping pressure and flow rate from the hydraulic fracturing unit (104), and modifying proppant load schedules in real time.

In accordance with one or more embodiment, in Block 722 the hydraulic aperture for the 3D fracture geometry may be used to predict the expected flow rates and decline curves of hydrocarbon production from the wellbore (104) and to design surface production facilities (110) of an appropriate size and characteristics.

Figure 8:
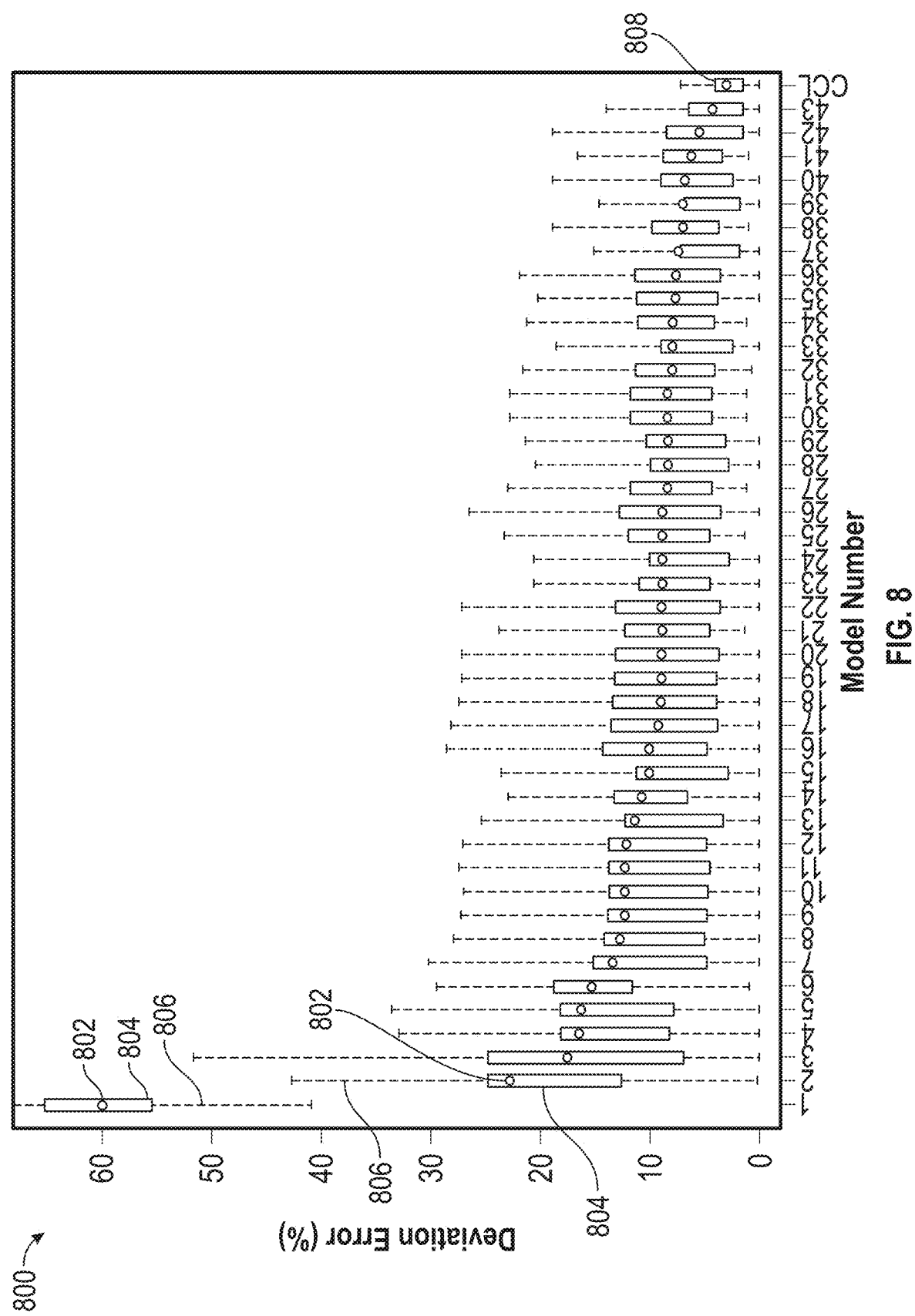
FIG. 8 shows a comparison between the errors associated with prior art methods and the results of the workflow depicted in the flowchart of FIG. 7 in accordance with one or more embodiments.

FIG. 8 shows the results (800) obtained from the workflow shown in FIG. 7, in accordance with one or more embodiments, in comparison to 43 alternative methods for obtaining the hydraulic aperture of an ensemble of fractures, described in the scientific literature and known to one of ordinary skill in the art. Hydraulic apertures for 7000 fractures were calculated using the 43 alternative methods, and an embodiment of the invention. The average error and the standard deviation of the error for each method was calculated by subtracting result obtained by solving the full-physics Navier-Stokes equation for single-phase fluid flow in a rough the fracture using the mixed finite element (MFE) method in FEniCS, a public domain platform described by Logg, A., Mardal, K-A., Wells, G. 2012 "*Automated Solution of Differential Equations by the Finite Element Method*", Springer, ISBN 978-3-642-23099-8, from the predicted value of the hydraulic aperture calculated by each method.

In FIG. 8 each dot (802) shows the mean error for the corresponding method; the rectangular box (804) extend one standard deviation on either side of the mean, and the dashed line (806) extend two standard deviations on either side. The results of one embodiment of the current invention (808) is shown on the extreme right of FIG. 8. It is clear that the accuracy and precision of the embodiment of the current invention is a substantial improvement over the preexisting methods.

Figure 9:
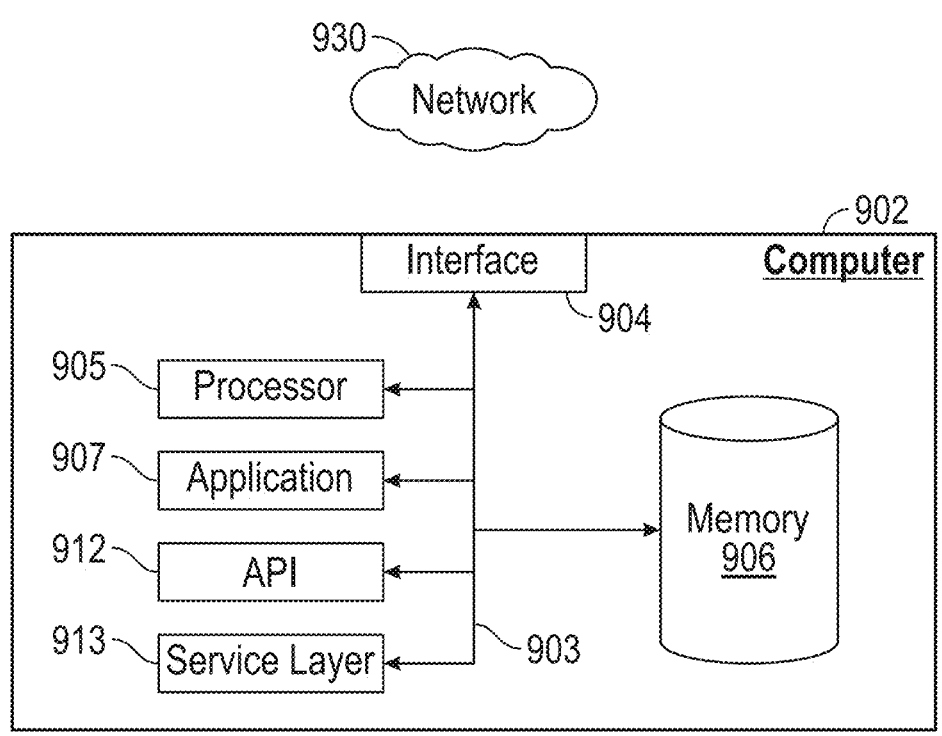
FIG. 9 shows a computer system in accordance with one or more embodiments.

Embodiment may be implemented on a computer system. FIG. 9 is a block diagram of a computer system (902) used to provide computational functionalities associated with described algorithms, methods, functions, processes, flows, and procedures as described in the instant disclosure, according to an implementation. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether illustrated, or) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or other suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiment without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method for determining a 3D hydraulic aperture of a 3D fracture, comprising:
   obtaining, using an X-ray tomography machine, a geometry of the 3D fracture;
   determining, using a computer processor, a fluid flow direction through the 3D fracture;
   dividing, using the computer processor, the 3D fracture into a plurality of 2D cross-sections oriented substantially parallel to the fluid flow direction;
   dividing, using the computer processor, each 2D cross-section into a plurality of Type I and Type II fracture segments based, at least in part, on a segment aspect ratio and a segment roughness ratio;
   determining, using the computer processor, a 2D segment hydraulic aperture for each of the plurality of Type I and Type II fracture segments;
   determining, using the computer processor, the 3D hydraulic aperture of the 3D fracture based, at least in part, on the 2D segment hydraulic apertures of the plurality of Type I and Type II fracture segments;
   designing a hydraulic fracturing plan based, at least in part, on the 3D hydraulic aperture; and executing, using a hydraulic fracturing unit, the hydraulic fracture plan by pumping a fluid into a well.

2. The method of claim 1, wherein determining the 3D hydraulic aperture, using the computer processor, comprises:
   determining a 2D cross-section hydraulic aperture for each 2D cross-section based, at least in part, on the 2D segment hydraulic apertures of the plurality of fracture segments comprising the 2D cross-section; and
   determining the 3D hydraulic aperture based, at least in part, on the 2D cross-section hydraulic apertures of each of the plurality of 2D cross-sections comprising the 3D fracture.

3. The method of claim 1, further comprising:
   predicting, using the computer processor, a hydrocarbon flow rate based, at least in part, on the 3D hydraulic aperture; and
   designing a surface production facility based, at least in part, on the hydrocarbon flow rate.

4. The method of claim 1, wherein dividing each 2D cross-section into a plurality of Type I and Type II fracture segments comprises identifying a plurality of Type I fracture segments, wherein each Type I fracture has a segment aspect ratio not exceeding a predetermined aspect ratio threshold and a segment roughness ratio not exceeding a predetermined segment roughness threshold.

5. The method of claim 1, wherein determining a 2D segment hydraulic aperture comprises forming a product of a segment roughness correction factor and a normal mechanical aperture.

6. The method of claim 1, wherein the 3D hydraulic aperture comprises forming a ratio of a cube root mean cube average of the 2D cross-section hydraulic aperture for a plurality of 2D cross-sections comprising the 3D fracture and a cube-root of a macroscopic fracture tortuosity.

7. A non-transitory computer readable medium storing instructions executable by a computer processor, the instructions comprising functionality for:
   receiving a geometry of a 3D fracture obtained by an X-ray tomography machine;
   determining, using a computer processor, a fluid flow direction through the 3D fracture;
   dividing, using the computer processor, the 3D fracture into a plurality of 2D cross-sections oriented substantially parallel to the fluid flow direction;
   dividing, using the computer processor, each 2D cross-section into a plurality of Type I and Type II fracture segments based, at least in part, on a segment aspect ratio and a segment roughness ratio;
   determining, using the computer processor, a 2D segment hydraulic aperture for each of the plurality of Type I and Type II fracture segments;
   determining, using the computer processor, the 3D hydraulic aperture of the 3D fracture based, at least in part, on the 2D segment hydraulic apertures of the plurality of Type I and Type II fracture segments; and
   designing a hydraulic fracturing plan to be executed based, at least in part, on the 3D hydraulic aperture, the executed hydraulic fracturing plan comprising pumping a fluid from a hydraulic fracturing unit into a well.

8. The non-transitory computer readable medium of claim 7, wherein determining the 3D hydraulic aperture comprises:
   determining a 2D cross-section hydraulic aperture for each 2D cross-section based, at least in part, on the 2D hydraulic segment apertures of the plurality of fracture segments comprising the 2D cross-section; and
   determining the 3D hydraulic aperture based, at least in part, on the 2D cross-section hydraulic apertures of each of the plurality of 2D cross-sections comprising the 3D fracture.

9. The non-transitory computer readable medium of claim 7, the instructions further comprising functionality for predicting a hydrocarbon flow rate based, at least in part, on the 3D hydraulic aperture.

10. The non-transitory computer readable medium of claim 7, wherein dividing each 2D cross-section into a plurality of Type I and Type II fracture segments, wherein each Type I fracture has a segment aspect ratio not exceeding a predetermined aspect ratio threshold and a segment roughness ratio not exceeding a predetermined segment roughness threshold.

11. The non-transitory computer readable medium of claim 7, wherein determining a 2D segment hydraulic aperture comprises forming a product of a segment roughness correction factor and a normal mechanical aperture.

12. The non-transitory computer readable medium of claim 7, wherein the 3D hydraulic aperture comprises forming a ratio of a cube root mean cube average of the 2D cross-section hydraulic aperture for the plurality of 2D cross-sections comprising the 3D fracture and a cube-root of a macroscopic fracture tortuosity.

13. A system comprising:
   an X-ray tomography machine for determining a geometry of a 3D fracture;
   a computer processor, configured to;
      receive the geometry of the 3D fracture;
      determine a fluid flow direction through the 3D fracture;
      divide the 3D fracture into a plurality of 2D cross-sections oriented substantially parallel to the fluid flow direction;
      divide each 2D cross-section into a plurality of Type I and Type II fracture segments based, at least in part, on a segment aspect ratio and a segment roughness ratio;
      determine a 2D segment hydraulic aperture for each of the plurality of Type I and Type II fracture segments;
      determine the 3D hydraulic aperture of the 3D fracture based, at least in part, on the 2D segment hydraulic apertures of the plurality of Type I and Type II fracture segments; and
      design a hydraulic fracturing plan based, at least in part, on the 3D hydraulic aperture; and
   a hydraulic fracturing unit for pumping a fluid into a well based on the hydraulic fracturing plan.

14. The system of claim 13, wherein the computer processor is further configured to:
   determine a 2D cross-section hydraulic aperture for each 2D cross-section based, at least in part, on the 2D hydraulic segment apertures of the plurality of fracture segments comprising the 2D cross-section; and
   determine the 3D hydraulic aperture based, at least in part, on the 2D cross-section hydraulic apertures of each of the plurality of 2D cross-sections comprising the 3D fracture.

15. The system of claim 13, wherein the computer processor is further configured to predict a hydrocarbon flow rate based, at least in part, on the 3D hydraulic aperture.

16. The system of claim 13, wherein the computer processor is further configured to determine the 2D segment hydraulic aperture based, at least in part, on a product of a segment roughness correction factor and a normal mechanical aperture.

17. The system of claim 13, wherein the computer processor is further configured to form a ratio of a cube root mean cube average of the 2D cross-section hydraulic aperture for the plurality of 2D cross-sections comprising the 3D fracture and a cube-root of a macroscopic fracture tortuosity.

* * * * *